United States Patent [19]

Seo

[11] Patent Number: 5,449,237
[45] Date of Patent: Sep. 12, 1995

[54] BEARING ASSEMBLY

[75] Inventor: Nobuyuki Seo, Yamatokoriyama, Japan

[73] Assignee: Koyo Seiko Co., Ltd., Osaka, Japan

[21] Appl. No.: 208,310

[22] Filed: Mar. 10, 1994

[30] Foreign Application Priority Data

Mar. 11, 1993 [JP] Japan .................. 5-016565

[51] Int. Cl.$^6$ .............................................. F16C 19/08
[52] U.S. Cl. ..................................... 384/448; 384/544
[58] Field of Search ............... 384/448, 446, 477, 544; 324/174

[56] References Cited

U.S. PATENT DOCUMENTS

| | | | |
|---|---|---|---|
| 3,716,788 | 2/1973 | Nishida | 324/174 |
| 4,795,278 | 1/1989 | Hayashi | 384/448 |
| 5,143,458 | 9/1992 | Alff et al. | 384/448 |

FOREIGN PATENT DOCUMENTS 323159  7/1989  European Pat. Off. .
299902  12/1990  Japan .

*Primary Examiner*—Lenard A. Footland
*Attorney, Agent, or Firm*—Popham, Haik, Schnobrich & Kaufman, Ltd.

[57] ABSTRACT

Disclosed is an improved bearing assembly comprising; an external member which forms a projected/recessed teeth domain on own external circumferential surface in order to make up a pulser portion and also forms a bearing raceway surface on own internal circumferential surface; an internal member which forms the other bearing track surface on own external circumferential surface; and a plurality of rolling elements which are individually disposed between respective raceway surfaces of the external and internal members. The bearing assembly is characterized in that phosphotized film is initially formed on the surface of the projected/recessed teeth domain and then either synthetic-resinous film or molybdenum film is superposed on the phosphate film coated on the projected/recessed teeth domain. By virtue of the coating of said films, the projected/recessed teeth domain for maing up the pulser portion is further coated with synthetic-resinous film by way of superposing on the phosphate film. Thus, even when the projected/recessed teeth domain is stained by muddy water or solution containing rust-generating contaminant, the pulser portion consisting of the projected/recessed teeth domain can constantly remain free of rust during service life.

1 Claim, 2 Drawing Sheets

BEARING ASSEMBLY

BACKGROUND OF THE INVENTION

The present invention relates to a bearing assembly incorporating a mechanism for detecting the number of the rotation of wheels of an automobile. More particularly, the invention relates to a bearing assembly capable of preventing erroneous detection of the number of the rotation of shafts and wheels of an automobile from occurrence conventionally being caused by rust.

The number of the rotation of an automobile is detected by operating an anti-skid brake system (ABS) mounted thereon. As shown in FIG. 3 for example, the Japanese Laid-Open Patent Publication No. HEI2-299902 of 1990 discloses such a device for detecting the number of the rotation of wheels of an automobile. This prior art provides a bearing assembly comprising; an external wheel hub 31 substantially being an external member which forms a specific pulser portion 32 on its external circumferential surface for rotating itself in conjunction with wheels and a raceway surface 33 on its internal circumferential surface; an internal wheel 41 substantially being an internal member which forms the other raceway surface 42 on external circumferential surface and accommodates a stationary shaft (not shown) inserted in an internal circumferential surface 43; and a plurality of balls respectively being disposed between raceway surfaces of the external and internal wheels. The pulser portion 32 composed of multiple projections protruding radially at a constant internal in the circumferential direction is formed as an external gear to the external circumferential surface of the external wheel hub 31. In association with the bearing assembly cited above, a pickup sensor 51 is disposed in opposition from the pulser portion 32 across predetermined clearance.

There are a variety of proposals on the pickup sensor 51 disposed in opposition from the pulser portion 32 provided for the external wheel 31. Basically, the pickup sensor 51 incorporates a magnetic circuit in order to detect variation of flux density of the pulser portion 32 incidental to the rotation of the wheels as precisely as possible.

In the event that rust is generated on the external wheel hub 31 making up a device for detecting the number of the rotation of wheels, in many cases, troublesome situation occurs without being able to disengage wheels from the chassis. In particular, the pulser portion 32 formed to the external wheel hub 31 is more gravely affected by rust than the external wheel hub 31, thus resulting in occurrence of significant error in the detected number of pulses. Nevertheless, when integrally forming the pulser portion 32 in association with the external wheel hub 31, extreme difficulty prevents the above-cited prior art from properly effecting rust-proof finishing. More particularly, execution of rust-proof thermal treatment at a high temperature often results in the tempering of the quenched raceway track, and in addition, when the rust-proof quenching process is executed before quenching the raceway track, because of quenched effect given to the raceway track, rust-proof effect is easily dissipated.

SUMMARY OF THE INVENTION

Therefore, the invention has been achieved to fully solve the above problems. It is an object of the invention to provide an improved bearing assembly incorporating a device for precisely detecting the number of the rotation of wheels by way of integrally combining a pulser portion with an external member, wherein the improved bearing assembly can securely prevent quenched effect given to raceway track from being lost and constantly maintain reliable rust-proof effect.

It is a primary object of the invention to provide an improved bearing assembly comprising; an external member which integrally forms projected/recessed teeth domain substantially making up a pulser portion on own external circumferential surface and a bearing raceway surface on own internal circumferential surface; an internal member forming the other bearing raceway surface on own external circumferential surface; and a plurality of rolling elements individualy being disposed on respective raceway surfaces of the external and internal members; wherein the improved bearing assembly according to the invention is characterized in that the projected/recessed teeth domain is coated with synthetic-resinous film or molybdenum disulfide film.

A still further object of the invention is to provide an improved bearing assembly comprising; an external member integrally forming projected/recessed teeth domain substantially making up a pulser portion on own external circumferential surface and a bearing raceway surface on own internal circumferential surface; an internal member forming the other bearing raceway surface on own external circumferential surface and accommodates a shaft member inserted in the internal circumferential surface thereof; and a plurality of rolling elements individually being disposed on respective raceway surfaces of the external and internal members; wherein the bearing assembly according to the invention is characterized in that at least phosphatized film is formed on the surface of the projected/recessed teeth domain, and yet, the phosphatized film surface is further coated with synthetic resinous film or molybdenum disulfide film.

Since the improved bearing assembly is complete with the above structure in which the projected/recessed teeth domain making up a pulser portion is finished with basic coating with phosphatized film and a further coating with synthetic resinous film or molybdenum disulfide film superposed thereupon, even after being stained by muddy water or solution containing rust-generating contaminant, the bearing assembly is securely prevented from generation of rust thereupon.

Further objects and advantageus features of the invention will more fully be understood from the following detailed description in association with the accompanying drawings that follow.

DESCRIPTION OF THE PREFERRED EMBODIMENTS

Figure 1A:
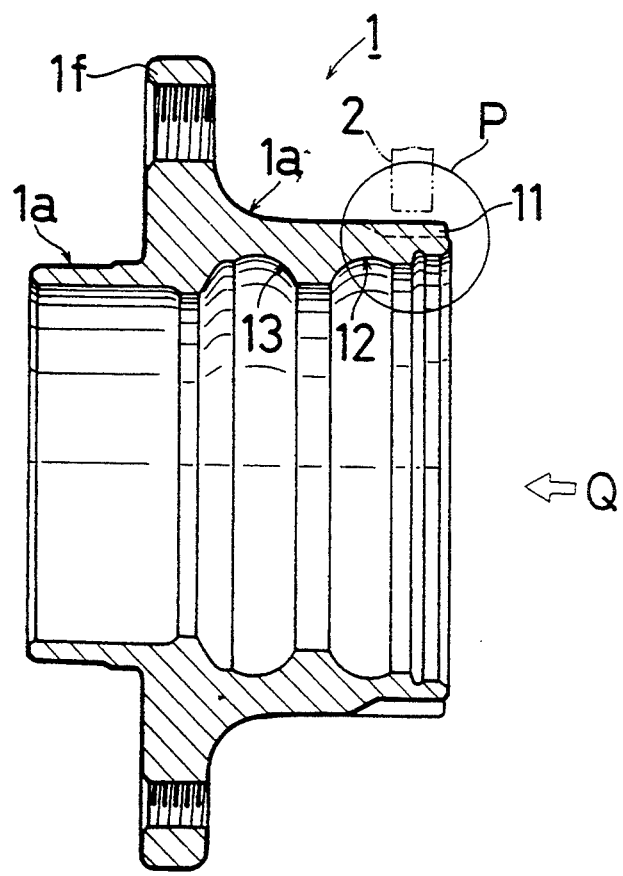
FIG. 1A is an axial-directional cross-sectional view of an external wheel hub being an external member for composing the improved bearing assembly according to the invention.
Figure 1B:
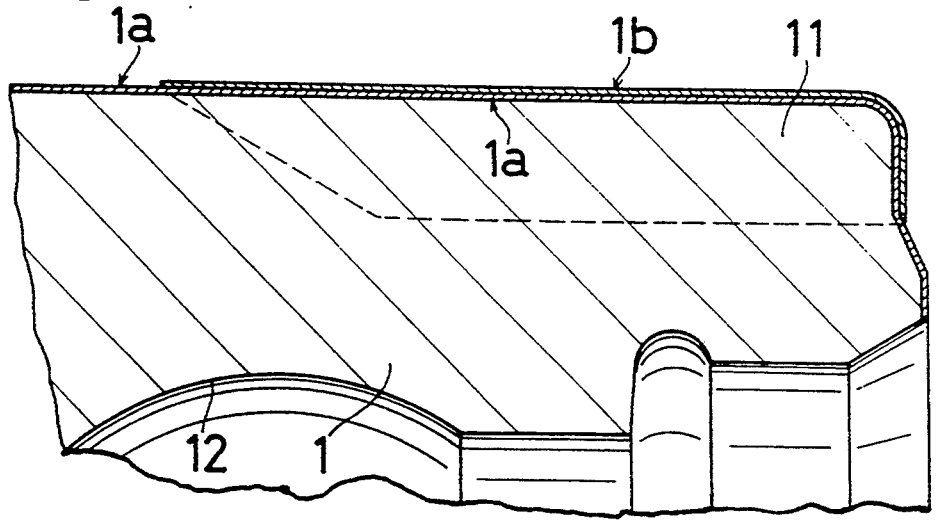
FIG. 1B is an enlarged view of the encircled domain P shown in FIG. 1A.
Figure 2:
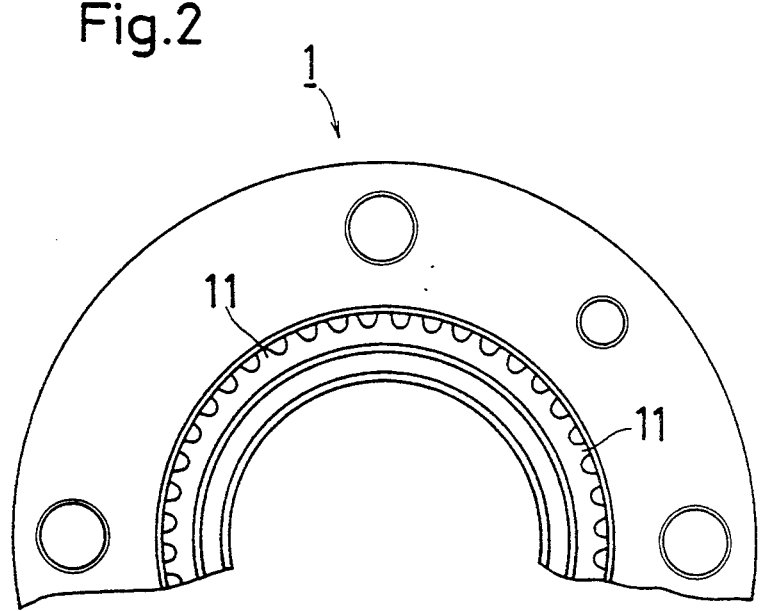
FIG. 2 is a cross-sectional view of part of the bearing assembly across domain Q indicated by arrowed line shown in FIG. 1A.
Figure 3:
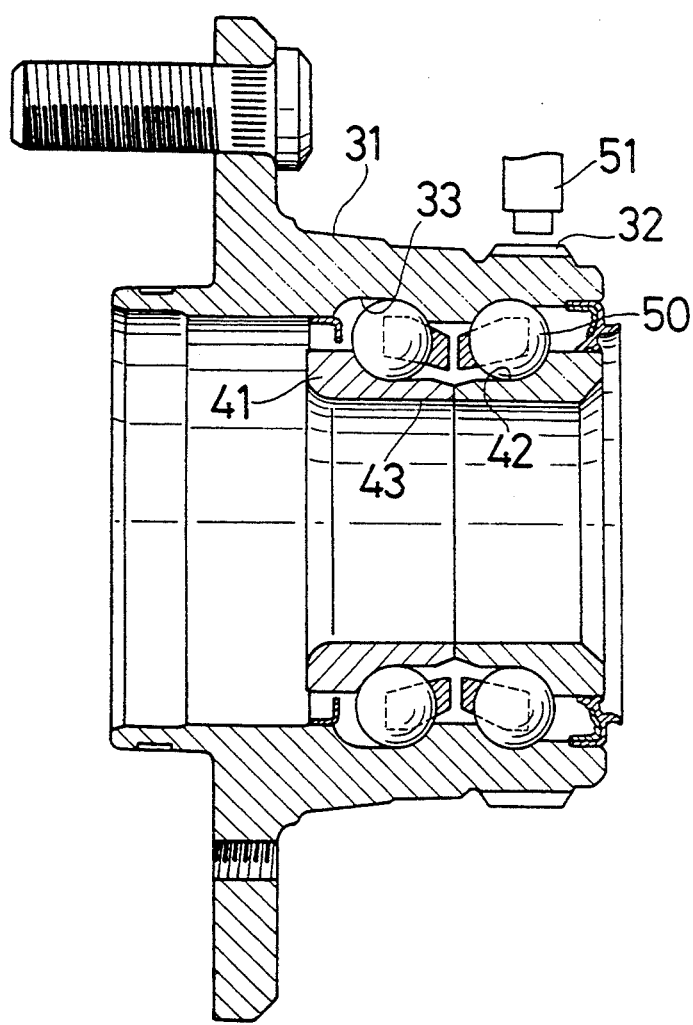
FIG. 3 is an axial-dirctional cross-sectional view of a conventioal bearing assembly.

Referring more particularly to the accompanying drawings, a preferred embodiment of the improved bearing assembly according to the invention is described below. FIG. 1A is an axial-directional cross-sectional view of an external wheel hub which makes up the bearing assembly according to the invention. FIG. 1B is an enlarged view of the encircled domain Q shown in FIG. 1A. FIG. 2 is a cross-sectional view of part of the bearing assembly across the domain Q indicated by arrowed line shown in FIG. 1A.

A flange member if of an external wheel hub 1 is secured to the side of a rotary wheel (not shown). Projected/recessed teeth domain 11 being a pulser portion is set to an edge domain of the external wheel hub 1. Namely, the pulser portion 11 is composed of multiple radial projections spaced at a constant interval in the circumferential direction and is formed as an external gear to the external circumferential surface of the external wheel hub 1. A pickup sensor 2 is secured to a stationary member in opposition from the projected/recessed domain 11 across predetermined clearance.

Normally, the external wheel hub 1 is fabricated via a forging process before integrally forming a projected/recessed teeth domain 11. In order to achieve a predetermined hardness degree, after executing a forging process, quenching and tempering processes are sequently executed to harden such domains surrounding raceway tracks 12 and 13. External circumferential surface at the tip of the projected/recessed teeth domain 11 is substantially flush with external circumferential surface of the external wheel hub 1.

The whole surface of the external wheel hub 1 is phosphatized in order to superficially generate phosphate film 1a.

As shown in FIG. 1, the phosphate film 1a is precipitately secured to the surface of the external wheel hub 1 via a phophatization process. The resultant phosphate film 1a comprises dense and porous crystals while featuring solid adhesion to rust-proof oil and distinct pressure-resistant property. While executing a phosphatization process, the phosphate film 1a previously formed on the raceway surfaces 12 and 13 of the external wheel hub 1 is removed by implementing a grinding process.

Next, the projected/recessed teeth domain 11 making up the pulser ring of the external wheel hub 1 is coated with rust-proof synthetic resin such as fluoro-carbon resin on the phosphate film 1a previously formed on the projected/recessed domain 11. If it is required to promote film strength in a short period of time, after the coating process, a quenching process may be executed at a certain tempering temperature applicable to the track domains 12 and 13.

Following the formation of the phosphate film 1a via a phosphatization process, in place of forming synthetic resinous film 1b, the projected/recessed teeth domain 11 of the external wheel hub 1 may be coated with molybdenum disulfide serving as solid lubricant by executing a quenching process. This leads to generation of double film capable of exerting distinct rust-proof effect.

As described above, the bearing assembly according to the invention is based on the formation of phosphate film 1a all over the surface of the external wheel hub 1 via a phosphatization process. In consequence, rust is substantially prevented from being generated. Furthermore, since the synthetic resinous film 1b is superposed on the phosphate film 1a which fully covers the projected/recessed teeth domain 11 for making up the pulser portion, even when the projected/recessed domain 11 is stained by muddy water or solution containing rust-generating contaminant, rust cannot substantially be generated.

Depending on the need, phosphatization process may solely be applied to local domains including the projected/recessed teeth domain 11 of the external wheel hub 1. Likewise, depending on condition of use, phosphatization process may be deleted.

Since the bearing assembly according to the invention incorporates the structure described above, by virtue of the coating of phosphate film 1a all over the pulser portion consisting of the projected/recessed teeth domain 11, the pulser portion can exert reliable rust-proof performance. In addition, by virtue of coating the pulser ring with double-layer film, rust-proof effect is further promoted. In consequence, whenever detecting the number of the rotation of wheels, practically, no error can be generated otherwise caused by rust. Therefore, the invention can provide highly reliable bearing assembly incorporating a high-performance device capable of precisely detecting the number of the rotation of wheels, thus providing advantage for correctly operating the anti-skid brake system (ABS) mounted on automobiles.

What is claimed is:
1. A bearing assembly comprising;
   an external member which forms a projected/recessed teeth domain on own external circumferential surface in order to make up a pulser portion and also forms a bearing raceway surface on own internal circumferential surface;
   an internal member which forms the other bearing raceway surface on own external circumferential surface; and
   a plurality of rolling elements which are individually disposed between respective raceway surfaces of said external and internal members; wherein said bearing assembly is characterized in that phosphatized film is formed at least on the surface of said projected/recessed teeth domain, and wherein either synthetic-resinous film or molybdenum disulfide film is superposed on phosphate film formed on said projected/recessed teeth domain via a coating process.

* * * * *